Jan. 5, 1960 R. G. RUSSELL 2,919,970
METHOD FOR ATTENUATING AND TREATING GLASS FIBERS
Filed May 9, 1955 2 Sheets-Sheet 1
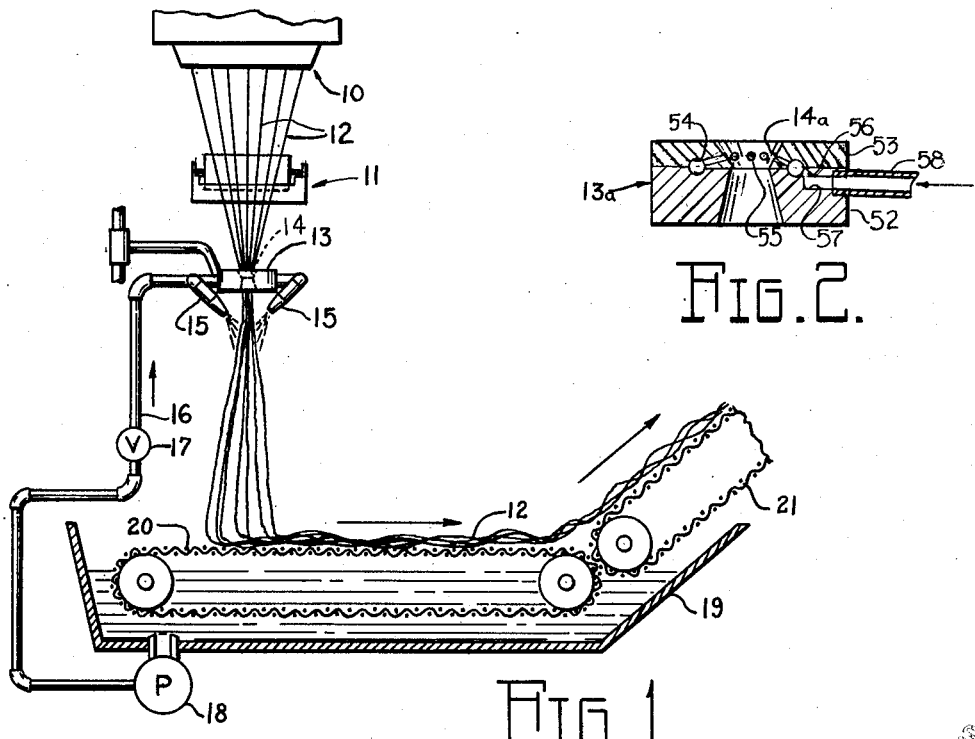
Fig.1.
Fig.2.
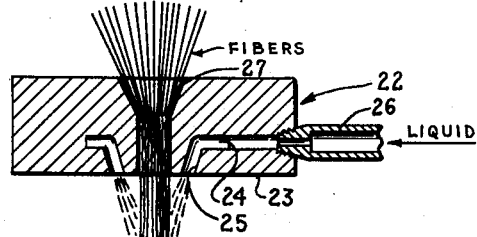
Fig.3.
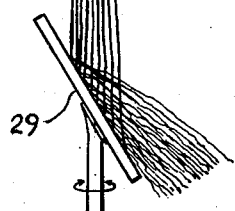
Fig.10.
INVENTOR.
ROBERT G. RUSSELL
BY
ATTORNEYS

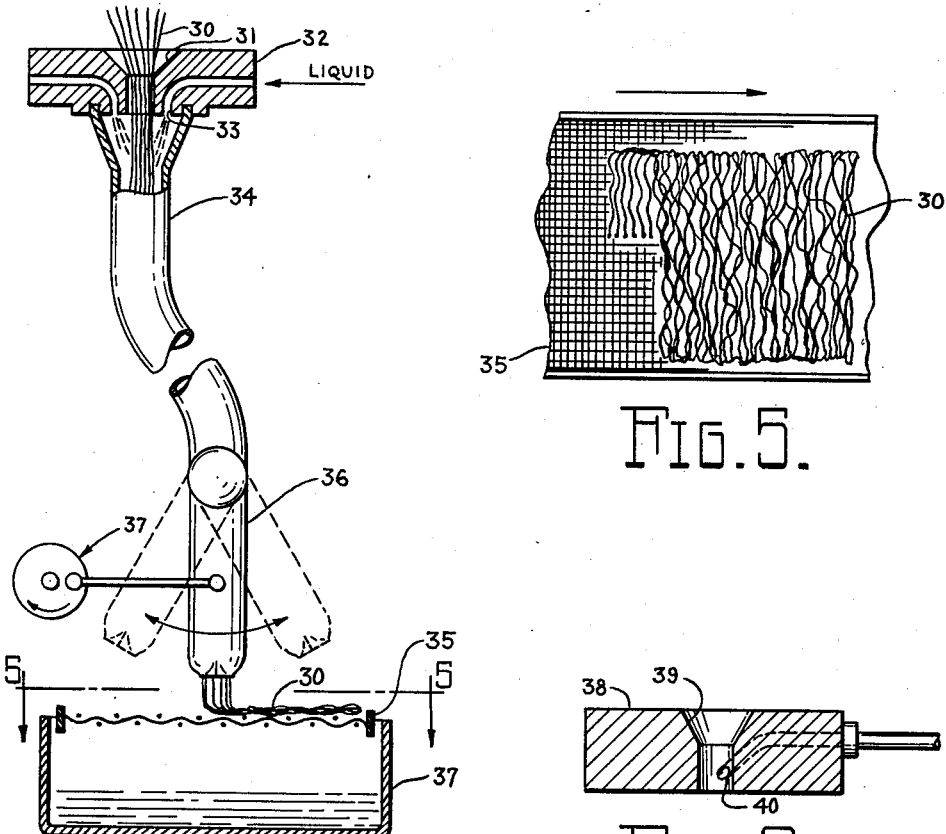

United States Patent Office 2,919,970
Patented Jan. 5, 1960

2,919,970

METHOD FOR ATTENUATING AND TREATING GLASS FIBERS

Robert G. Russell, Granville, Ohio, assignor to Owens-Corning Fiberglas Corporation, a corporation of Delaware Application May 9, 1955, Serial No. 506,816

7 Claims. (Cl. 18—54)

This invention relates to a method for attenuating or for attenuating and treating glass fibers.

Glass fibers are formed commercially by several means and methods which attenuate the filaments either continuously or interruptedly from streams of molten glass. Several processes wherein streams of molten glass are subjected to high velocity air, steam and gas jets are employed as well as other direct systems where the molten streams are allowed to cool slightly and the cooled ends are actually grasped and pulled mechanically or otherwise in order to attenuate the streams into filaments. In the case of attenuation by gas blast, large volumes of attenuating gas whether it be steam, air or combustion products, must be disposed of after the kinetic energy of the gas has been used to attenuate the streams into fibers. In the case of mechanical pulling means as, for example, by wrapping the attenuated fibers around a rotary package and rotating the package at a high speed to provide the attenuating tension, the fibers must be removed from the attenuating instrumentalities before they can be utilized or made into final end products.

It is the principal object of this invention to provide a method for attenuating glass fibers wherein the attenuating force or tension is applied to the fibers by a liquid which is directed onto the fibers and generally along their path of attenuation and which applies to them the energy necessary to draw them from the molten streams of fiber forming material.

Through the use of a liquid to apply the fiber attenuating force a number of advantages are achieved. Among others, the liquid may be caught and recirculated. In the case of gases, the recirculation problems are exceedingly difficult because of the volume required. Furthermore, the liquid may be utilized as a carrier for coating compounds such as lubricants for the glass fibers or resinous materials such as binders and glues or coloring materials, or the liquid-fiber admixture can be used as a carrier for paper pulp in the production of reinforced papers. In such utilization of the instant invention the excess coating, binder, dye, etc. is not wasted but is recollected with the liquid and can be recirculated for use merely by pumping it again through the system.

Not only can many materials be carried by liquid carriers, for example, an aqueous dispersion of a resin, but many materials compatible with glass and with which it is desired to coat the glass, may themselves be liquid. For example, it may be desired to make a laminate consisting of a glass fiber coated with a thin layer of metal. If such a laminate is desired the method and apparatus of the instant invention may be employed to utilize a liquefied metal such as lead, zinc, alloys of lead, alloys of zinc, lead-cadmium alloys, Rose's alloy, Wood's metal and perhaps even higher melting metals and alloys such as aluminum and others. The only limitations upon the metal or alloy used would, of course, be the temperature to which the glass might be raised without damage. This would vary with the particular glass used.

The method of the instant invention contemplates not only that a liquid may be used to apply the attenuating force to the glass or other fiber forming material but also that the liquid which furnishes the attenuating force can be directly utilized to coat or otherwise treat the fibers as they are formed.

The method of the invention and further objects and advantages thereof will be better understood from the specification which follows and from the drawings in which:

Fig. 1 is a somewhat diagrammatic view, partly in elevation and partly in section, illustrating apparatus upon which the method of the invention may be carried out.

Fig. 2 is a greatly enlarged, vertical, sectional view in detail of fiber gathering means as employed in the apparatus of Fig. 1, and illustrating a modification thereof.

Fig. 3 is a fragmentary, somewhat diagrammatic view, partly in section, of a modified form of apparatus for carrying out the process according to the invention.

Fig. 4 is a fragmentary, diagrammatic view illustrating yet another modification of apparatus employed to carry out the process of the invention for the continuous fabrication of a glass mat.

Fig. 5 is a fragmentary, horizontal, sectional view taken substantially from the position indicated by the line 5—5 of Fig. 4.

Fig. 6 is a view similar to Fig. 2 but of a modified means.

Fig. 7 is a greatly enlarged, transverse, sectional view of a glass fiber coated with metal as it would be produced according to the invention.

Fig. 8 is a view similar to Fig. 7 but of a glass fiber that is produced and coated with a lubricant according to the invention.

Fig. 9 is a view similar to Figs. 7 and 8 but of a resin coated glass fiber.

Fig. 10 is a view similar to Fig. 3 but on a still further enlarged scale showing a modified form of apparatus for practicing the invention.

In carrying out the method of the invention a source of molten glass generally indicated at 10 which may be a "bushing" or a melter, is provided with a plurality of minute orifices (not shown) through which gravity causes fine streams of glass to flow. In the apparatus shown, as the streams of glass cool they are led over a roll applicator 11 as individual fibers 12 which are then gathered together and led through a gathering eye 13. The eye 13 may be center bored, for example, by an oppositely flared opening 14, to group and guide the fibers 12 into general parallelism. The roll applicator 11 applies water or other liquid to the fibers 12 to lubricate them. In addition, the gathering eye may be fabricated from a self-lubricating material such as graphite or from other smooth surfaced materials in order to minimize abrasion of the glass filaments.

The gathering eye 13 is located near a plurality of nozzles 15. In this instance the nozzles 15 are connected into a liquid circulatory system including suitable piping 16, a throttling valve 17 and a pump 18 which, in turn, is connected to a sump 19. The pump 18 creates pressure in the liquid in the circulating system and, depending upon the setting of the throttling valve 17, the liquid is sprayed or jetted out of the nozzles 15 with a pressure necessary to create a suitable attenuating velocity for the fibers 12. Impingement of the liquid under pressure against the fibers 12 where they emerge from the gathering ring 13, causes entrainment, as it were, of the fibers 12 and applies attenuating tension to the fibers 12. This tension is transferred up the fibers 12 to that portion thereof where they are being formed from the cooling streams that flow from the melter 10.

The jets of water emanating from the nozzles 15 are directed downwardly toward the sump 19 and toward a horizontal foraminous conveyor 20 which runs across the sump 19. The conveyor 20 screens the fibers 12 out of the spray of liquid and carries them across the sump 19 to where they are transferred to an upwardly inclined conveyor 21 which leads the fibers away for subsequent processing. The liquid which has acted to attenuate the fibers 12 and to carry them downwardly onto the conveyor 20, passes through the conveyor 20 and into the sump 19 whence it is recirculated by the pump 18.

While the apparatus as shown in Fig. 1 is greatly simplified, it will be appreciated that apparatus as indicated is functional where the liquid is a simple liquid such as water or a water dispersion or solution of a surface treating agent for the glass fibers. For example, the liquid in the sump 20 might be an aqueous dispersion of a lubricant or a solution or dispersion of another type of surface treating agent, such as a synthetic resin or a size. Since the jets of liquid from the nozzles 15 must be so directed as to impinge upon all of the fibers 12 being pulled and since they preferably are directed from at least two opposite sides of the generally parallel mass of fibers 12, penetration of the liquid into the interior of the mass of fibers is provided for so that whatever the agent that is carried by the liquid, it is deposited upon the fibers being attenuated. Suitable temperature and other controls may be necessary to provide for the proper adherence of the material carried by the liquid so that the liquid will readily separate from the material and so that excess liquid and material, if any, will be carried into the sump 19.

It will also be appreciated that if the liquid to be employed to attenuate the fibers 12 is a liquefied metal, provision must be made for maintaining the metal at a temperature such that it remains liquid during circulation and spreading and for causing it to cool and to solidify between the time when it is sprayed onto the fibers and when the fibers are carried away from the mass of liquid metal.

Similarly, the liquid employed may be merely the final coating material such as thermoplastic resin, in liquid or molten form. In other words, while water is an excellent attenuating liquid used alone, and liquids comprising water may be employed, as explained, the presence of water in the liquid is not essential and non-aqeous liquids may also be employed according to the invention.

Fig. 2 is a vertical sectional view on an enlarged scale of a modification of fiber gathering means comprising a gathering eye 13a having a body in which there is bored an oppositely flared opening 14a for grouping and guiding the fibers 12 into general parallelism. Like the gathering eye 13 of Fig. 1 the eye 13a of Fig. 2 may be fabricated from a self-lubricating matereial such as graphite or similar material for the purpose of preventing abrasion of glass fibers as they pass therethrough.

In the embodiment of Fig. 2 the gathering eye 13a has two parts, a main body 52 and a cap 53 which mate to form an annular manifold generally indicated at 54 and connected to a plurality of small orifices 55 intersecting the flared opening 14a on its output side. The manifold 54 is connected by a short passageway 56 to a duct 57 in which a liquid tube 58 is brazed or otherwise sealed.

The tube 58, for example, is connected to a source of water under pressure or it may be connected to the attenuating and coating liquid system including the pipes 16 of Fig. 1.

By feeding a small quantity of either the attenuating liquid or of water into the flared opening 14a the lubricating characteristics of the water or of the liquid being used for attenuation are utilized to prevent abrasion of the individual fibers 12 as they are pulled through the gathering eye 13a and to reduce the force necessary to attenuate and pull the fibers 12 through the gathering eye 13a.

Fig. 3 illustrates a modified form of gathering means generally indicated at 22 and consisting of a block 23 drilled to form a manifold 24 and a plurality of annularly arranged jet openings 25. The attenuating and/or surface treating liquid is fed into the block 23 from an input pipe 26. A central bore 27 extends through the block 23.

Instead of catching the fibers 12 directly on a conveyor, as in Fig. 1, in the apparatus of Fig. 3 a group of fibers 28 being attenuated by the liquid forced out of the jet openings 25 is directed against the surface of an oscillatory deflector plate 29. The fibers 28 and the jet of liquid are reflected off the oscillatory deflector plate 29 and the impact of the fibers against the deflector plate 29 as well as the splashing of the jet of liquid off the deflector plate 29 "shatters" or separates the fibers 28 one from the other creating larger voids and interstices between the fibers as they are subsequently collected either on a conveyor similar to the conveyor 20, and not shown in Fig. 3, or on other conveying means.

Oscillation of the plate 29 about its vertical axis sprays the fibers 28 back and forth transversely to the direction of movement of the conveyor, if one is used, to assist in building up the mass of fibers thereon.

The modification of apparatus as shown in Figs. 4 and 5 incorporates a further consideration which permits delivery of the attenuated and/or surface treated fibers at a point remote from the source of location of the molten glass. In Fig. 4 a group of fibers 30 is shown as being led through a bore 31 in a gathering eye 32 and subjected to the attenuating force of a liquid sprayed from a plurality of orifices 33 in the eye 32 and into the upper, generally funnel shaped, end of a tubing 34. The tubing 34 is broken in Fig. 4 to indicate that it may be led to any desired point remote from the location of the eye 32 and the source of molten glass from which the fibers 30 are pulled. For example, a plurality of bushings spaced over a considerable area of a fabricating plant might each be provided with the apparatus shown in Fig. 4 and all of the fibers pulled from all of the bushings could be gathered together over a single conveyor, for example the conveyor 35 of Figs. 4 and 5, so that all of the output fibers from this group of bushings could be accumulated into one relatively thick continuous mass of glass fibers. If desired, the lower end of the tubing 34 might connect to a swinging nozzle generally shown at 36 actuated, for example, by crank and arm 37, to oscillate back and forth across the conveyor 35 to lay the fibers 30 on the conveyor 35. The conveyor 35 might extend across above a suitable tank or sump 37 in which the attenuating and/or surface treating liquid would be gathered by recirculation.

In Fig. 5 it will be observed that with the oscillating nozzle 36 the fibers are laid back and forth across the width of the conveyor 35 generally perpendicularly to its direction of movement. While only one tube 34 and nozzle 36 is shown in Fig. 4, it will be appreciated that a plurality of nozzles may be spaced along the length of the conveyor 35 to lay up a separate layer of fibers 30 from each nozzle thereby thickening the mass of fibers as it is built up upon the conveyor 35. Correlation of fiber feeding speed, nozzle swinging speed and conveyor speed, as well as the number of devices all contribute to the final characteristics of the mat.

It will be appreciated, of course, that since the liquid utilized for attenuating and/or surface treating the fibers is pumped under considerable pressure—the pressure being selected to achieve the attenuating speed desired—sufficient force exists in the liquid to carry both the liquid and the entrained fibers along through the tubing 34 for substantial distances. In addition, if the distance which the fibers are to be conveyed is greater than the initial pressure makes possible, booster pumps may be located along the tubing 34 to boost the pressure in the conveying liquid.

In Fig. 6 there is illustrated a gathering and spraying eye 38 having a central orifice 39 into which a tangential jet 40 opens. Feeding the attenuating and/or surface treating liquid into the orifice 39 tangentially, results in a swirling action which gives the attenuated fibers a different relationship to each other from that achieved by the relatively straight spray emanating from the jets of the earlier figures.

Figs. 7, 8 and 9 are illustrative of the types of coatings which may be added to glass fibers as they are attenuated through the practice of the instant invention. In Fig. 7 a glass fiber 41 is shown as having a peripheral coating 42 of metal. In Fig. 8 a glass fiber 43 is illustrated as being coated by a "lubricant" 44, i.e., a surface coating for protection of the fiber. The lubricant 44 might be present merely for surface protection or for facilitating bonding, linking or dispersion in a mass to be reinforced. The coating might be resinous as illustrated in Fig. 9 where a fiber 45 is shown with a resinous sheath 46.

Fig. 10 shows a gathering ring 47 having a partly tapered bore 48 similar to the eyes 13 of Fig. 1, 22 of Fig. 3, and 32 of Fig. 4 through which a plurality of fibers 49 are attenuated by a jet of liquid 50 directed through the ring 47 from a nozzle 51. This arrangement applies the liquid 50 directly to the fibers 59 with very little loss in pressure since the liquid is not led through any manifolds or passageways.

The emplacement of suitable surface treating materials such as resins, metal, lubricants, etc., either organic or inorganic, makes possible a further direct utilization of the fibers produced through the instant invention. For example, by attenuating the fibers through the use of a liquid metal to apply the tension and thus producing metal coated fibers, a suitable mass of metal coated fibers may be accumulated in a mold or form and heat may then be applied to re-fuse the metal into a shape determined by the mold. This might be extremely advantageous where certain parts fabricated from metal do not in themselves have sufficient dimensional stability at the temperature to which they are subjected in use. As an illustration, in the aircraft industry unreinforced aluminum, ordinarily used to achieve lightness, is unsatisfactory for certain parts because the temperatures and stresses to which the parts are subjected in modern aircraft cause the aluminum to "creep," i.e., change dimension. By molding or casting the part from a mass of compact and densified metallic coated fibers, the part is fabricated from aluminum but the aluminum is reinforced throughout its mass by the glass fibers which have a tensile strength in the order of 200,000 p.s.i. Great dimensional stability is thus given to the aluminum casting or molding.

Similarly, sheaths for cables frequently are formed from lead which is extruded around the exterior of a cable and its insulation. One difficulty encountered in such a cable arises from the substantial weight of the lead and its low tensile strength. Reinforcement for such a lead sheathed cable is frequently supplied in the form of a high tensile strength steel core. In the preparation of fibers according to the invention, the fibers may be attenuated by molten lead or lead alloy and thus each fiber coated with a quantity of the lead or lead alloy. By then suitably arranging the fiber gathering means the fibers may be braided or otherwise formed exteriorly of the cable and the lead re-fused to make a weather-proof sheath having the additional quality of high tensile strength derived from the incorporated glass fibers.

Similarly, the utilization of a liquid resin or a resinous dispersion or solution as the attenuating liquid results in coating the fibers with a resin so that a mass of fibers coated with an appropriate resin can be directly molded or otherwise treated to produce a glass reinforced resinous mass.

The selection of the particular attenuating liquid and the particular advantages derived from that selection do not in themselves constitute the instant invention. It is, rather, the utilization of a liquid for attenuation of the fibers either as a method or through the medium of apparatus embodying the invention, and the further concept that such attenuating liquid may incorporate surface treating materials or in itself be a surface treating material for the fibers, which is sought to be protected by the claims.

I claim:

1. In a method for forming, attenuating and coating filaments which includes the steps of flowing a plurality of streams from a supply of molten fiber forming material, attenuating the streams into fibers, gathering the fibers into general parallelism in a loosely associated group, and applying a coating composition to the gathered fibers, the improvement which comprises directing a liquid coating composition under pressure around the gathered fibers, into contact therewith and at least generally longitudinally therealong for coating and applying tension to said fibers and for causing attenuation of said streams.

2. A method according to claim 1 in which the liquid coating composition under pressure comprises water.

3. A method according to claim 2 in which the liquid coating composition under pressure consists of an aqueous carrier and a fiber coating compound carried thereby and in which the water is removed from the fibers after deposition of the compound thereon.

4. A method according to claim 1 in which the liquid coating material is anhydrous.

5. A method according to claim 1 in which the liquid coating composition is a liquefied metal having a liquid temperature less than the glass damage temperature.

6. A method according to claim 1 in which the fibers are gathered together simultaneously with the impingement of the liquid coating composition thereon.

7. A method according to claim 1 in which the fibers and the liquid coating composition are directed into and through a conduit leading to a remote fiber gathering station.

References Cited in the file of this patent

UNITED STATES PATENTS

| | | |
|---|---|---|
| 1,871,100 | Walton et al. | Aug. 9, 1932 |
| 2,173,789 | Nikles et al. | Sept. 19, 1939 |
| 2,206,058 | Slayter et al. | July 2, 1940 |
| 2,509,279 | Sisson | May 30, 1950 |
| 2,526,775 | Slayter et al. | Oct. 24, 1950 |
| 2,622,306 | Anderson | Dec. 23, 1952 |
| 2,699,415 | Natchman | Jan. 11, 1955 |